United States Patent
Coon et al.

[19]

[11] Patent Number: 6,108,171
[45] Date of Patent: Aug. 22, 2000

[54] ULTRA-COMPACT SUSPENSION WITH SUPERIMPOSED MOUNTING PLATE

[75] Inventors: Warren Coon; Amanullah Khan, both of Temecula, Calif.

[73] Assignee: Magnecomp Corp., Temecula, Calif.

[21] Appl. No.: 09/173,201

[22] Filed: Oct. 15, 1998

Related U.S. Application Data

[60] Provisional application No. 60/062,606, Oct. 20, 1997.

[51] Int. Cl.[7] .................................................. G11B 5/596
[52] U.S. Cl. .................................. 360/244.2; 360/244.8; 360/244.9; 360/245
[58] Field of Search .............................. 360/104, 244.2, 360/244.8, 244.9, 245

[56] References Cited

U.S. PATENT DOCUMENTS

| | | | |
|---|---|---|---|
| 5,666,241 | 9/1997 | Summers .............................. | 360/104 |
| 5,796,555 | 8/1998 | Aoyagi et al. ........................... | 360/104 |
| 5,936,803 | 8/1999 | Berding .................................. | 360/104 |

*Primary Examiner*—Robert S. Tupper
*Attorney, Agent, or Firm*—Louis J. Bachand

[57] ABSTRACT

An ultra compact disk drive suspension for supporting a read-write head slider at a disk surface comprising a load beam having generally an E-shape with a base, and extending from the base a center portion, a left portion and a right portion all generally extending in a first horizontal plane, a flexure generally extending in a second horizontal plane vertically spaced from the first horizontal plane, the flexure being attached to the left and right load beam portions, the load beam having a dimple in contact with the flexure, a head slider supported by the flexure in disk surface opposed relation, and a mounting plate extending in a third horizontal plane, the mounting plate being attached to the load beam at the left and right portions only.

11 Claims, 4 Drawing Sheets

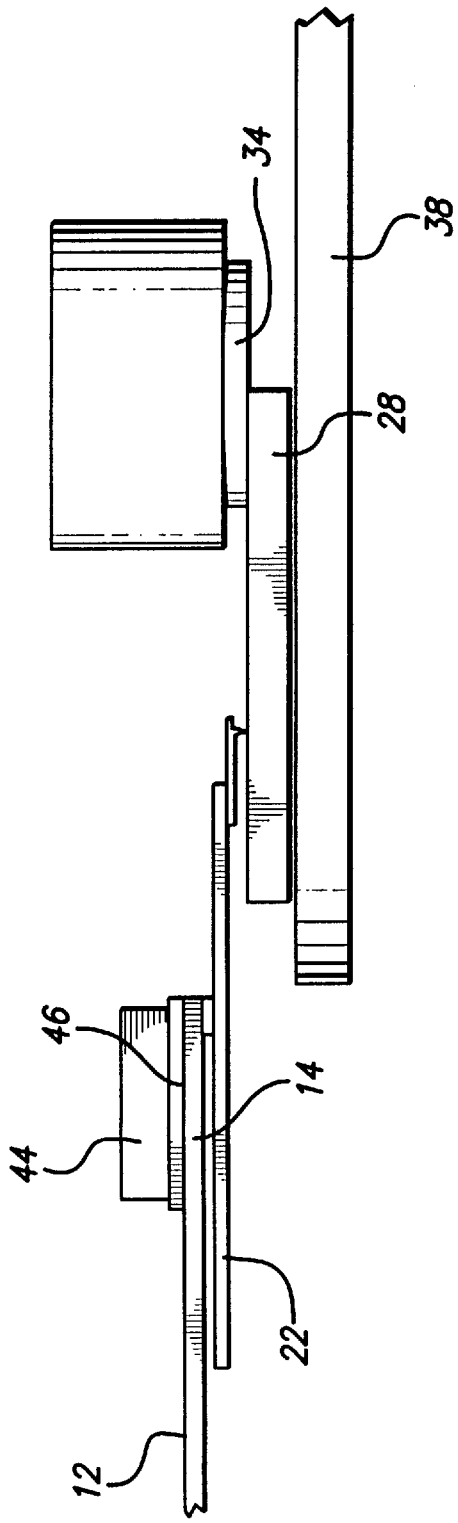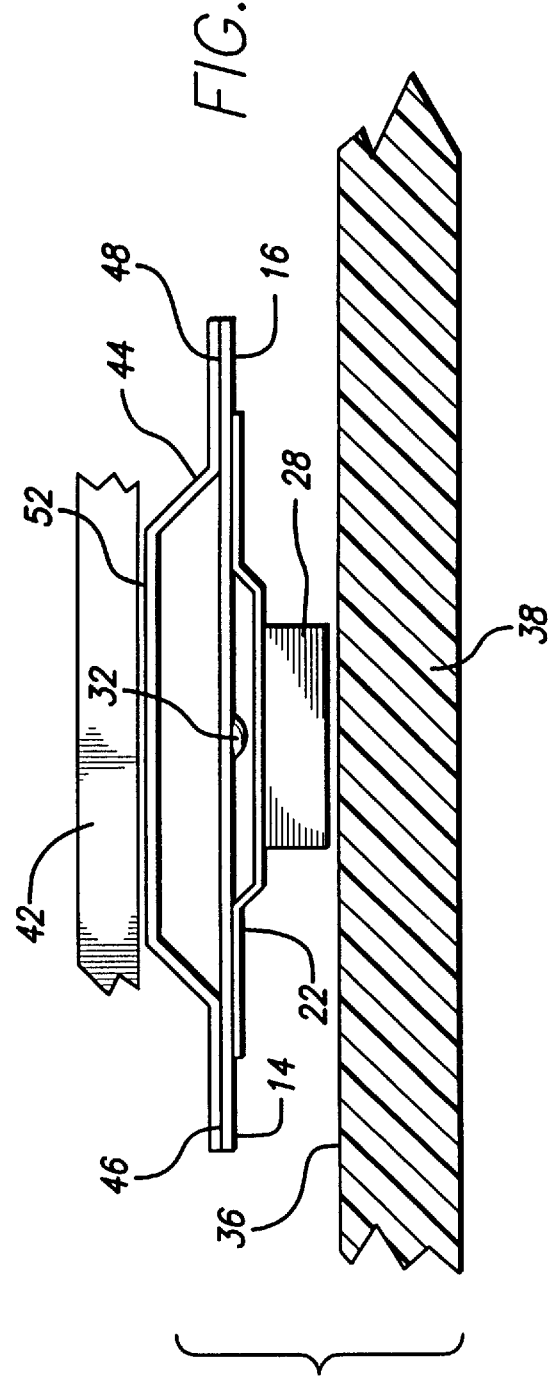

ULTRA-COMPACT SUSPENSION WITH SUPERIMPOSED MOUNTING PLATE

REFERENCE TO RELATED APPLICATION

This application claims the benefit of Provisional Application Ser. No. 60/062,606 filed Oct. 20, 1997.

BACKGROUND OF THE INVENTION

This invention has to do with disk drive suspensions, and, more particularly, with an ultra compact disk drive suspension that fits into extremely small volumes, such as those one-third or even less in lateral area than typically occupied by conventional, small size suspension.

Specifically, the invention provides for suspension installations of very small volume a form of suspension that reduces the length of the load beam, increases the size of the flexure, and uses a mounting plate disposed vertically relative to the load beam and flexure, occupying the same vertically extended locus occupied by the load beam and flexure, rather than a locus laterally disposed relative to the load beam and flexure. The form of the load beam is modified to achieve the desired spring loading properties and the flexure is given a size compatible with anchoring to the modified load beam. The invention suspension can be used with magnetic or optical heads and associated heads and sliders.

RELATED ART

In the prior art flexures have become smaller over time, but still occupy an inch or more of lateral distance. The present suspensions are intended to occupy as little as one-third that lateral distance, or even less.

BRIEF SUMMARY OF THE INVENTION

It is an object of the invention to provide a new form of slider supporting disk drive suspension. It is a further object to provide an ultra-compact disk drive suspension in which the components are vertically stacked and not longitudinally disposed relative to each other. These and other objects of the invention to become apparent hereinafter are realized in an ultra compact disk drive suspension comprising a load beam, a flexure, a slider head, and a mounting plate operatively associated and in vertically stacked relation.

More particularly, the invention provides an ultra compact disk drive suspension for supporting a read-write head slider at a disk surface, the suspension comprising a load beam having generally an E-shape with an elongated base, and extending normal to the base, all relatively shorter than the base, a center portion, a left portion and a right portion all generally extending in a first horizontal plane, a flexure generally extending in a second horizontal plane vertically spaced from first horizontal plane, the flexure being attached to the left and right load beam portions, the load beam having a dimple in contact with the flexure, a head slider supported by the flexure in disk surface opposed relation, and a mounting plate extending in a third horizontal plane, the mounting plate being attached to the load beam at the load beam left and right portions only.

In this and like embodiments of the invention, typically: the load beam is generally planar, the load beam center portion is greater in length than its the left or right portions, the load beam is less than one-quarter inch in the transverse direction, the load beam base left and right portions are at least partially angularly disposed relative to its the center portion, the left and right portions being of generally symmetrical with each other and typically of uniform width from the load beam base outward, the load beam left and right portions have terminals parallel to the load beam center portion, the mounting plate is attached to the load beam left and right portions at the respective terminals of the portions, the load beam is weld attached to the left and right load beam portions, the flexure has generally a cruciform shape, with its crosspiece attached to the load beam base, the flexure has an elongated member extending normal to its crosspiece, the flexure elongated member defining a flexure tongue, the tongue being in contact with the head slider.

BRIEF DESCRIPTION OF THE DRAWINGS

The invention will be further described in conjunction with the attached drawings in which:

FIG. 6 is a side elevation view of the invention disk drive suspension; and,

FIG. 7 is an end elevation view thereof.

DETAILED DESCRIPTION OF THE INVENTION

The invention is particularly useful for ultra compact disk drive suspension applications. Compactness in size, as little as 0.300 cubic inch, or 0.220 inch in the transverse dimension, while retaining the responsiveness and preloading capabilities of larger suspensions, is characteristic of the invention device. The invention compactness derives in significant part from the stacking one over the other of the several suspension elements, including particularly locating the mounting plate in superposed position above (or below) the load beam, the flexure and the head carrying slider which are themselves shaped and stacked one upon the other for compactness.

Figure 1:
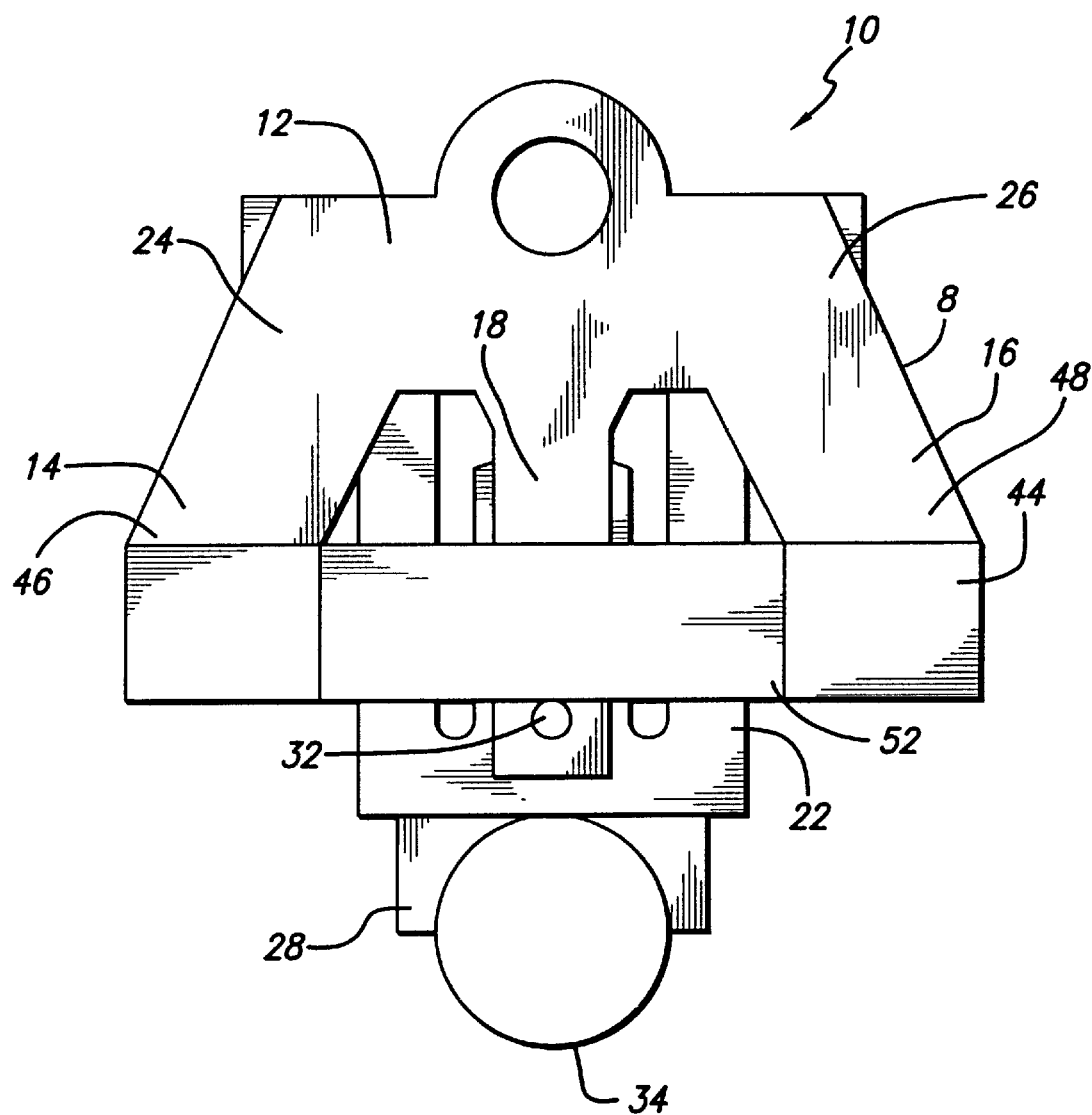
FIG. 1 is a plan view of the invention disk drive suspension.
Figure 2:
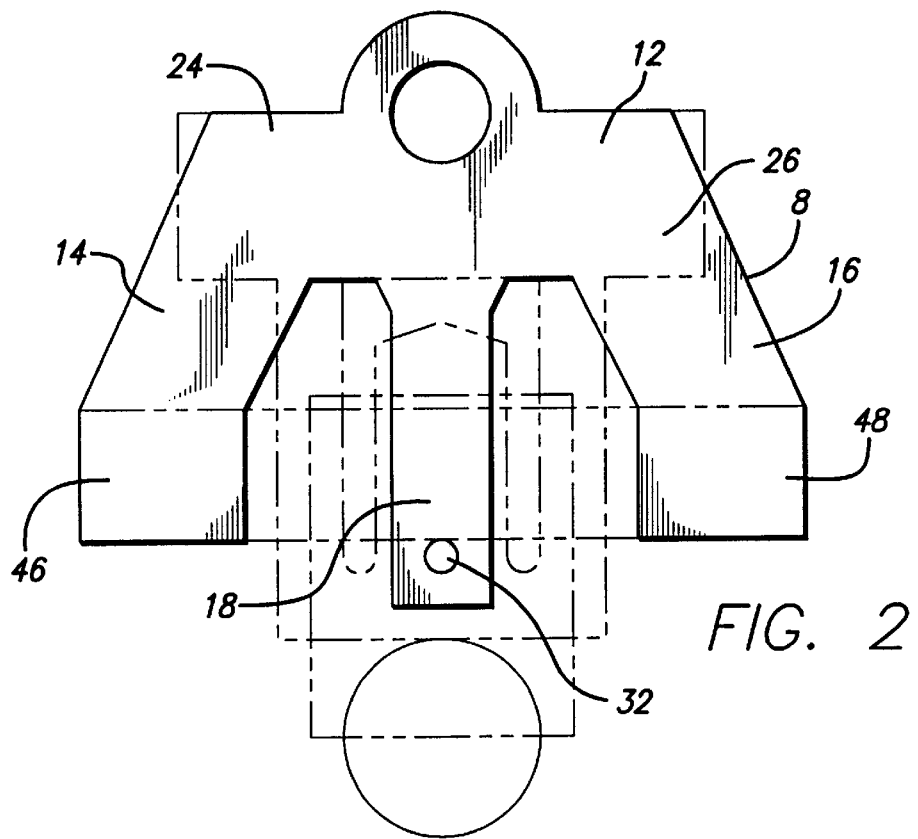
FIG. 2 is a plan view of the load beam portion thereof.
Figure 3:
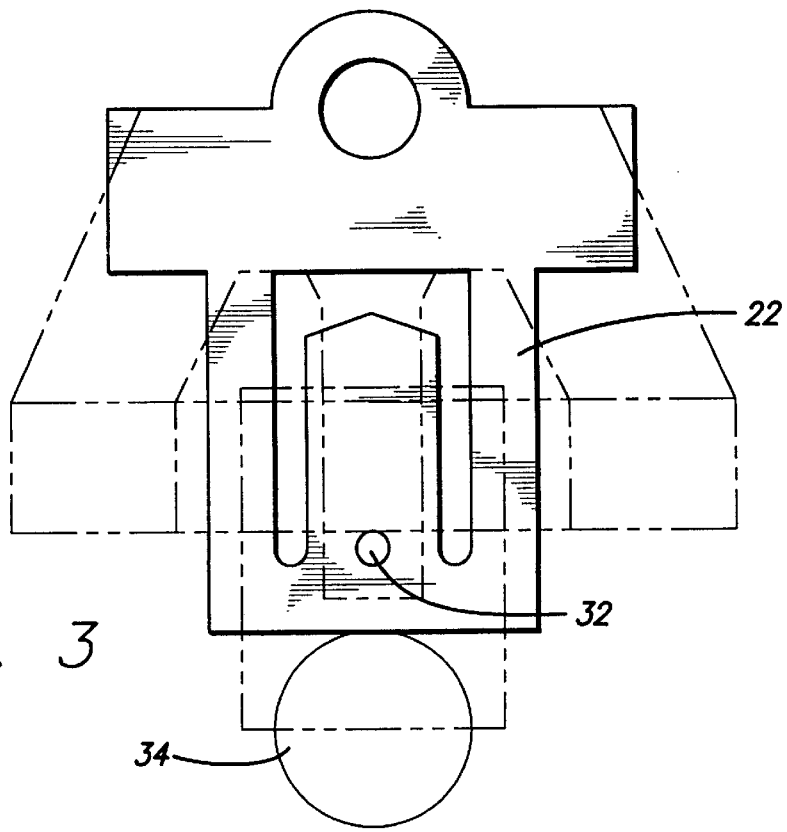
FIG. 3 is a plan view of the flexure portion thereof.
Figure 4:
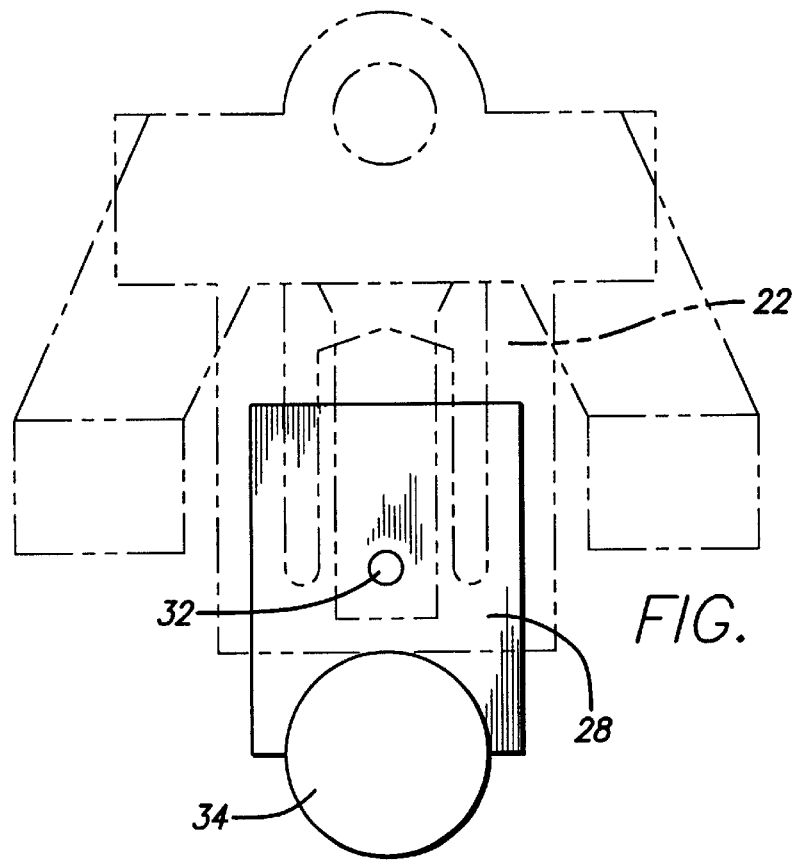
FIG. 4 is a plan view of the head slider portion thereof.
Figure 5:
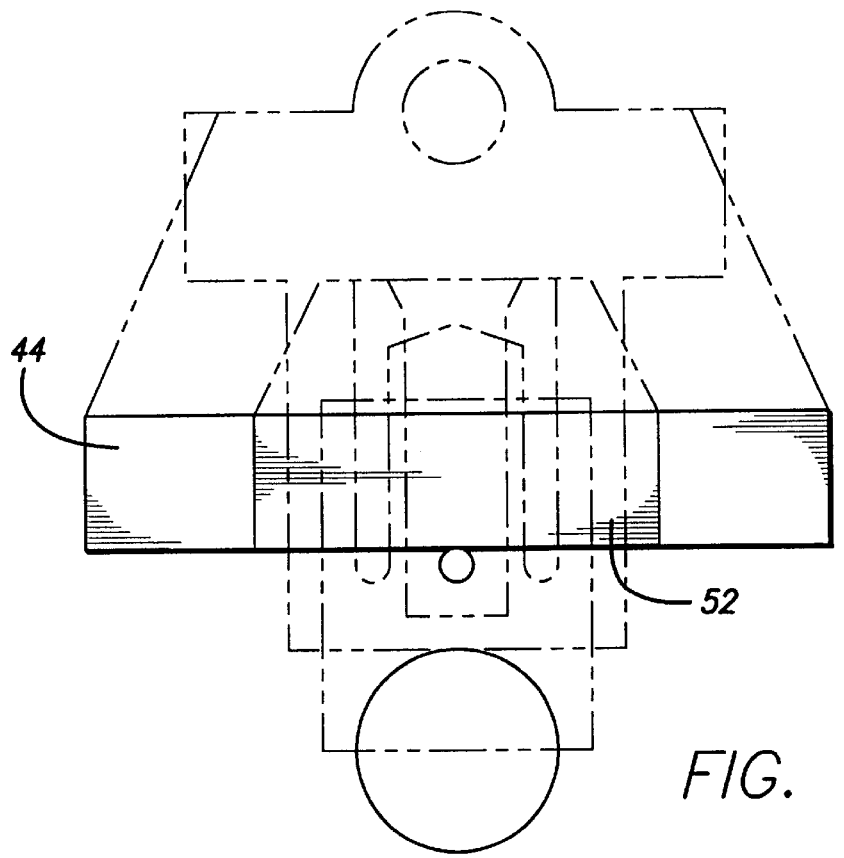
FIG. 5 is a plan view of the mounting plate portion thereof.

With reference now to the drawings in detail, in FIGS. 1, 6 and 7, the disk drive suspension 10 includes a generally E-shaped load beam 8 having a base 12 and extending generally normally thereto a left portion 14, a right portion 16 and a center portion 18. The load beam left and right portions 14, 16 define spring sections of the load beam 8. The load beam center portion 18 defines the flexure mounting locus and in a conventional suspension would be cantilevered and highly rigid, through the use of side rails for example. The suspension flexure 22 is substantially coextensive with the load beam so as to permit attachment of the flexure to the left and right load beam portions 14, 16 e.g. at glue or weld locations 24, 26. Slider 28 is glued or welded to the flexure 22 for gimballing movement about load beam dimple 32 to carry the read/write head 34, be it magnetic or optical (shown) in proper orientation to the surface 36 of disk 38. See FIGS. 1–7.

For translational or angular movement the disk drive suspension 10 is mounted to an actuator 42 by the mounting plate 44 which is attached as by welding to the terminals 46, 48 of the load beam left and right portions 14, 16, thus to support the suspension in its intended place. The mounting plate 44 comprises an elongated metal strip, which suitably has a center upset 52 for attachment to the actuator 42.

The invention thus provides an ultra compact disk drive suspension for supporting a read-write head slider at a disk surface comprising a load beam having generally an E-shape with a base, and extending from the base a center portion, a left portion and a right portion all generally extending in a first horizontal plane, a flexure generally extending in a second horizontal plane vertically spaced from the first horizontal plane, the flexure being attached to the left and right load beam portions, the load beam having a dimple in contact with the flexure, a head slider supported by the flexure in disk surface opposed relation, and a mounting plate extending in a third horizontal plane, the mounting plate being attached to the load beam at the left and right portions only.

The foregoing objects are thus met.

We claim:

1. An ultra compact disk drive suspension comprising a load beam having a longitudinal axis, a base portion lying transverse to said axis, and left, right and center portions relative to said axis, a flexure attached to said load beam base portion and disposed opposite said load beam center portion at a predetermined locus, a slider head supported by said flexure, and a mounting plate lying transversely of said load beam longitudinal axis parallel to and longitudinally spaced from said load beam base portion opposite said predetermined locus, said mounting plate having left and right end portions disposed in a predetermined plane and attached to the terminals of said load beam left and right portions respectively, and a center portion therebetween deflected from the plane of said end portions, whereby said load beam, flexure and mount plate arc operatively associated and vertically stacked relative to said predetermined locus.

2. An ultra compact disk drive suspension for supporting a read-write head slider at a disk surface, said suspension comprising a load beam having generally an E-shape with a base portion, and extending from said base portion a center portion, a left portion and a right portion all generally extending in a first horizontal plane, a flexure generally extending in a second horizontal plane vertically spaced from first horizontal plane, said flexure being attached to said left and right load beam portions at a predetermined locus, a head slider supported by said flexure in disk surface opposed relation, and a mounting plate extending transversely of said load beam in a third horizontal plane, said mounting plate being disposed opposite said predetermined locus and attached to said load beam at said left and right portions only.

3. The ultra compact disk drive suspension according to claim 2, in which said load beam is generally planar.

4. The ultra compact disk drive suspension according to claim 2, in which said load beam center portion is greater in length than its said left or right portions, said mounting plate having a deflected center portion opposite said load beam center portion.

5. The ultra compact disk drive suspension according to claim 2, in which said load beam extends less than one-quarter inch in the transverse direction.

6. The ultra compact disk drive suspension according to claim 2, in which said load beam left and right portions angle away from said load beam center portion from said load beam base outward, said left and right portions being generally symmetrical with each other about the longitudinal axis of said load beam center portion.

7. The ultra compact disk drive suspension according to claim 6, in which said load beam left and right portions have terminals parallel to said load beam center portion longitudinal axis.

8. The ultra compact disk drive suspension according to claim 7, in which said mounting plate is attached to said load beam left and right portions at the respective terminals of said portions.

9. The ultra compact disk according to claim 8, in which said load beam is weld attached to said left and right load beam portion terminals.

10. The ultra compact disk drive suspension according to claim 2, in which said flexure has generally a cruciform shape, with its crosspiece attached to said load beam base.

11. The ultra compact disk drive suspension according to claim 10, in which said flexure has a cantilevered, elongated member extending normal to its crosspiece, said flexure elongated member defining a flexure tongue, said tongue being in contact with said head slider.

* * * * *